G. A. MEAD.
METHOD OF UNITING DISSIMILAR METALS.
APPLICATION FILED JAN. 8, 1920.

1,341,337. Patented May 25, 1920.

Witness
Harry Wilkinson

Inventor
George A. Mead

UNITED STATES PATENT OFFICE.

GEORGE A. MEAD, OF MANSFIELD, OHIO, ASSIGNOR TO THE OHIO BRASS COMPANY, OF MANSFIELD, OHIO, A CORPORATION OF NEW JERSEY.

METHOD OF UNITING DISSIMILAR METALS.

1,341,337.    Specification of Letters Patent.    Patented May 25, 1920.

Application filed January 3, 1920. Serial No. 350,101.

*To all whom it may concern:*

Be it known that I, GEORGE A. MEAD, a citizen of the United States of America, residing at Mansfield, in the county of Richland and State of Ohio, have invented certain new and useful Improvements in Methods of Uniting Dissimilar Metals, of which the following is a specification.

My invention relates to the method of electrically connecting or bonding track rails used in electric haulage systems.

My invention has in view a method of connecting the adjacent rails so as to form a continuous conductor by electrically welding or brazing the terminals of a bond to a surface of the rail. There are various ways of applying bonds to rails through the medium of the electric current but the method of applying the electric current and the method which I employ is that of heating the various parts by passing the current through the assembled parts until the fusion of the parts to be united takes place, or by applying an element to the bond terminal which is brought up to a high heat by an electric current.

This method of applying the electric current in uniting a rail bond to a rail is old but my invention resides more particularly in the application of the electric current in this way in combination with and arrangement of various parts and various steps as herein more fully described and claimed.

The description of the drawings and invention is as follows.

I have found in applying bonds to rails by means of an electric current which is passed through the bond and rail for the purpose of heating the contacting faces, either with or without an interposed metal acting as a braze, and where a carbon block is applied to the outer face of the terminal for the purpose of bringing the bond up to a high degree of heat which in turn is transmitted through the parts, that the contacting face of the bond terminal with the carbon block is very apt to be brought up to a melting temperature before the contacting faces between the bond terminal and the rail and in some cases the terminal is actually melted down entirely. My invention has in view the overcoming of this difficulty and resides in interposing between the carbon block and the copper terminal of the rail bond as heretofore used, a plate of metal having a higher melting point than the copper of the terminal. This interposed high melting point metal can be either separable from the bond or securely attached to the same to form a part of the bond and this latter construction is the preferable as the resistance between the interposed metal and the bond terminal is thereby reduced which in turn reduces the temperature at this point as the $I^2R$ loss is much less.

Figures 1, 3, 4:
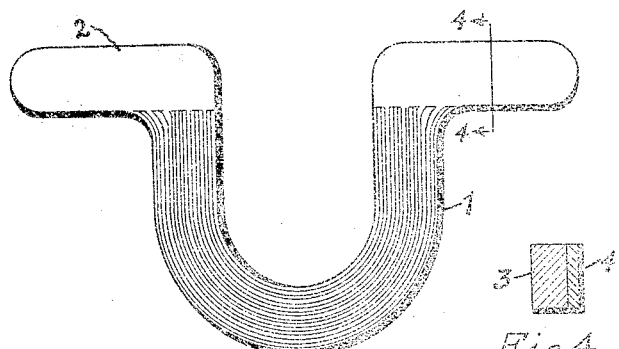
Figure 1 shows a face elevation view of the bond which I propose to use.
Fig. 3 shows an end elevation view of the bond.
Fig. 4 shows a section of a terminal of the bond on the line 4—4 of Fig. 1.

In Fig. 1 I show a bond in which numeral 1 represents the body of a bond of a flexible character and 2 represents the terminals secured to the body 1. The terminals are composed of two parts, namely the copper mass which faces the rail indicated by 3 and the protecting plate 4 which is secured to the terminal part 3 by direct welding or brazing. The protecting plate 4 may be composed of iron, steel, nickel or Monel metal or other metal having a higher melting point than the part 3.

Figure 5:
Fig. 5 shows a modified section of the bond terminal.

The protecting plate 4 is shown as being applied to one face of the terminal, namely that opposite to the face which is applied to the rail but this protecting plate can also be extended to all faces of the bond terminal excepting that which is applied to the rail and as shown in Fig. 5 in which the protecting plate is indicated by the numeral 5 and shows surrounding three sides of the rectangular terminal part 3.

Figure 2:
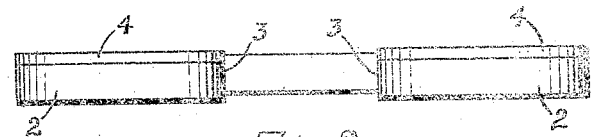
Fig. 2 shows a top plan view of the bond.
Figure 6:
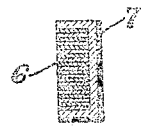
Fig. 6 shows another modification in section of the bond terminal.

In Fig. 6 the modification shown comprises a terminal in which the conducting portion is composed of individual layers of conducting material, preferably copper, and indicated by the numeral 6 and having a protecting plate 7 inclosing three sides thereof. The protecting plate 7 is preferably united to the individual layers 6 along its face which is opposite to the face of the terminal which is applied to the rail.

Figure 8:
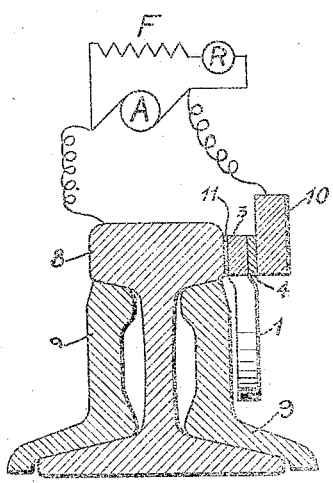
Fig. 8 is a sectional view of Fig. 7 on the line 8—8.
Figure 7:
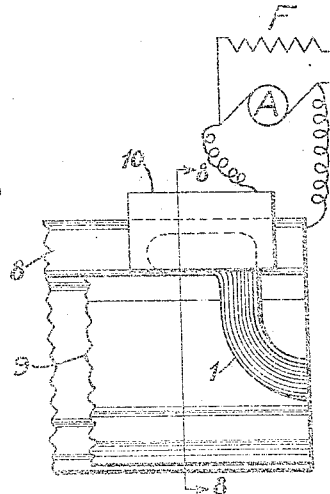
Fig. 7 shows a side elevation view of the arrangement of the parts showing the method of application of the bond together with an indication of the method of applying the electric current to the parts.

In Figs. 7 and 8 are shown the method and relation of the various parts in making an application of my invention and in these figures I have shown a rail 8 provided with a fish-plate 9 as is usual at the end of rails and a bond engaging the face of the rail and held thereto by a carbon block 10. Interposed between the copper terminal 3 and the face of the rail 8 is shown a strip of brazing metal 11 and interposed between the copper terminal 3 and the carbon block 10 is shown a plate of metal 4 having a higher melting point than the copper terminal 3. Sufficient pressure by suitable apparatus is applied to the block 10 to hold all parts in close contact and relative position on the rail.

The electric current used for heating the various parts may be secured from any suitable source and I have illustrated a source consisting of a generator A having one terminal connected to the rail and the other terminal connected to the carbon block. The current flowing through the rail and block and through the bond is controlled by a variable resistance R connected in series with the field F and both of which are connected to the terminals of the generator.

After the parts have been arranged in position as shown in Figs. 7 and 8 the current is caused to pass through the rail 8, brazing metal 11, copper of the terminal 3, the interposed metal plate 4 and the carbon block 10 and the current value is increased until the parts have become sufficiently heated so that the brazing metal 11 is fused, thereby uniting the bond and rail together. During the period of heating the carbon block 10 will be brought up to an incandescent heat which is far in excess of the melting point of the copper but when the block 10 is in contact with the copper 3 it is found that the terminal 3 is very liable to be fused and many times entirely melted away before the heat in the rail has become sufficiently high or the brazing metal 11 fused and this difficulty is overcome by interposing between the carbon block 10 and the copper of the terminal 3 the high melting point plate 4.

The melting point of copper is approximately 1980° Fahrenheit and that of iron approximately 2785 to 2800° Fahrenheit, depending upon the grade. As the interposed metal plate 4 is preferably welded to the copper of the terminal 3, the contact resistance between the parts 3 and 4 will be a minimum and will be very much less than the contact resistance between the carbon block 10 and the part 4. It will be found by this method of bonding that the parts can all be brought up to a proper degree of heat more uniformly when the carbon block or other high resistance material of a similar character contacts with the copper terminal 3 and the result will be a more reliable union between the rail and the bond and great economy in bonding as many bonds are lost entirely through present methods by the terminal being entirely melted away and having to be replaced. Also the care required by the operator is less with my herein disclosed method than with other methods.

Figure 9:
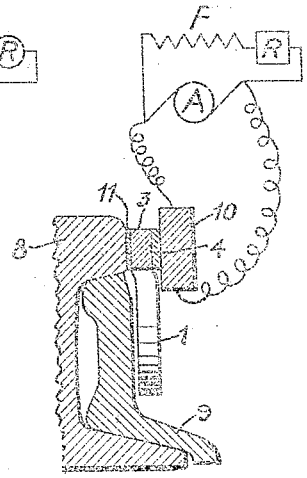
Fig. 9 shows a modification of Fig. 8 and a different method of applying the electric current.

In Fig. 9 I show a modification of the attachment of the electric circuits and application of the heating current in that the current is passed through the electrode only which is brought up to the desired heat.

Having described my method what I claim is:

1. The method of uniting metals of unlike heat conductivity and different temperatures of fusion comprising the steps of holding the parts in contact at the desired point of union by pressing an electrode of high resistance against the part having the lowest melting point and greatest heat conductivity with a plate of metal interposed having a lower heat conductivity and a higher melting point than the aforesaid metal, then passing an electric current through the electrode and producing a high temperature therein which is transmitted to the metal parts to be united by conduction, said heat to be applied until the metals to be united are brought to a temperature at which they will unite.

2. The method of uniting two metals of unlike heat conductivity by applying heat from an external source consisting in the steps of holding said metals in contact at the desired point of union and having interposed between the external source of heat and one of the metals to be united a metal plate having a higher melting point than that of the metal having the higher heat conductivity, and then applying heat from an external source to be transmitted to the parts by conduction until the parts to be united are brought up to a welding heat.

3. The method of uniting a bond to a rail consisting of the steps of interposing between said bond and rail at the desired point of union a relatively more fusible material, then holding the bodies in contact with such material interposed, then pressing an electrode of high resistance against the outer face of the bond with an interposed metal of greater fusibility than the bond and then passing an electric current through the electrode and parts to produce a high temperature in the electrode and parts, thereby uniting the bond to the rail by the heat generated in the parts and from the heated electrode.

4. The method of bonding rails consisting in forming up a bond body of a plurality of members, then positioning the bond in a rail surface, then applying a high resistance electrode to the bond body at a point opposite its contacting face with the rail and with a plate of metal having a higher melting point than the bond body interposed between the bond and the electrode and then passing an electric current through the parts and of sufficient magnitude and length of time to bring the parts up to a temperature at which the bond will unite with the rail.

5. The method of bonding rails consisting in forming up a bond body of a plurality of members, then securing to the bond body at a point opposite the face to be secured to the rail a plate of metal having a higher melting point than the bond body, then positioning the bond on a rail with a plate of brazing metal interposed between the bond body and the rail, then positioning a high resistance electrode against the higher melting point plate and then passing an electric current through the parts and of sufficient magnitude and length of time to bring the parts up to a temperature at which the brazing metal will melt and unite the bond to the rail.

6. The method of bonding rails consisting in forming up a bond body of a plurality of members, then positioning the bond on a rail surface with a plate of brazing metal interposed between the bond and the rail, then applying a high resistance electrode to the opposite side of the bond body with a plate of metal having a higher melting point than the bond body interposed between the body and the electrode and then passing an electric current through the electrode to bring the same up to a high degree of heat which is transmitted through the parts to be united by conduction until the parts are heated to a point where union will take place.

7. The method of bonding rails consisting in forming up a bond body of a plurality of members; then securing to the body a plate of metal having a higher melting point than the body; then positioning the face of the bond opposite the higher melting point plate on a rail surface; then positioning a high resistance electrode against the high melting point plate; then passing an electric current through the electrode of sufficient magnitude and for a sufficient length of time until the parts are heated by conduction to a point where union will take place between the parts.

8. The method of uniting metals of unlike heat conductivity comprising the steps of holding said metals in contact at the desired point of union; then applying to one of the metals at a point opposite the point of union, a high resistance electrode with a plate of metal interposed having a higher melting point than the metal part with which it contacts; then passing an electric current through the electrode and the parts to be united and bringing all parts up to a temperature at which the parts to be united will unite.

In testimony whereof I affix my signature.

GEORGE A. MEAD.